June 18, 1957 I. H. POLK 2,795,939
APPARATUS FOR FREEZING PACKAGED PRODUCTS
Filed Aug. 30, 1951 5 Sheets-Sheet 1

INVENTOR
ISAAC H. POLK
BY
ATTORNEYS

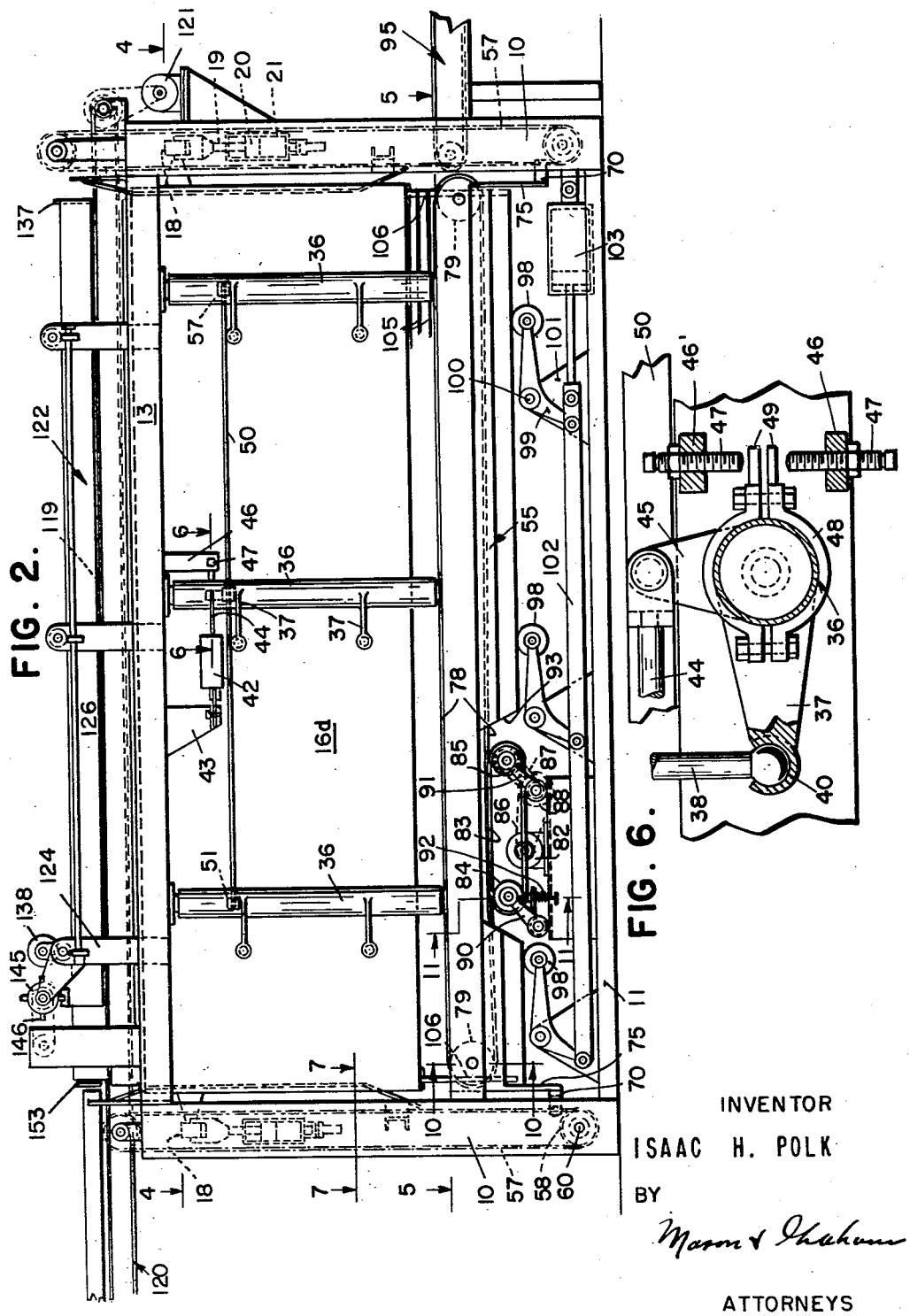

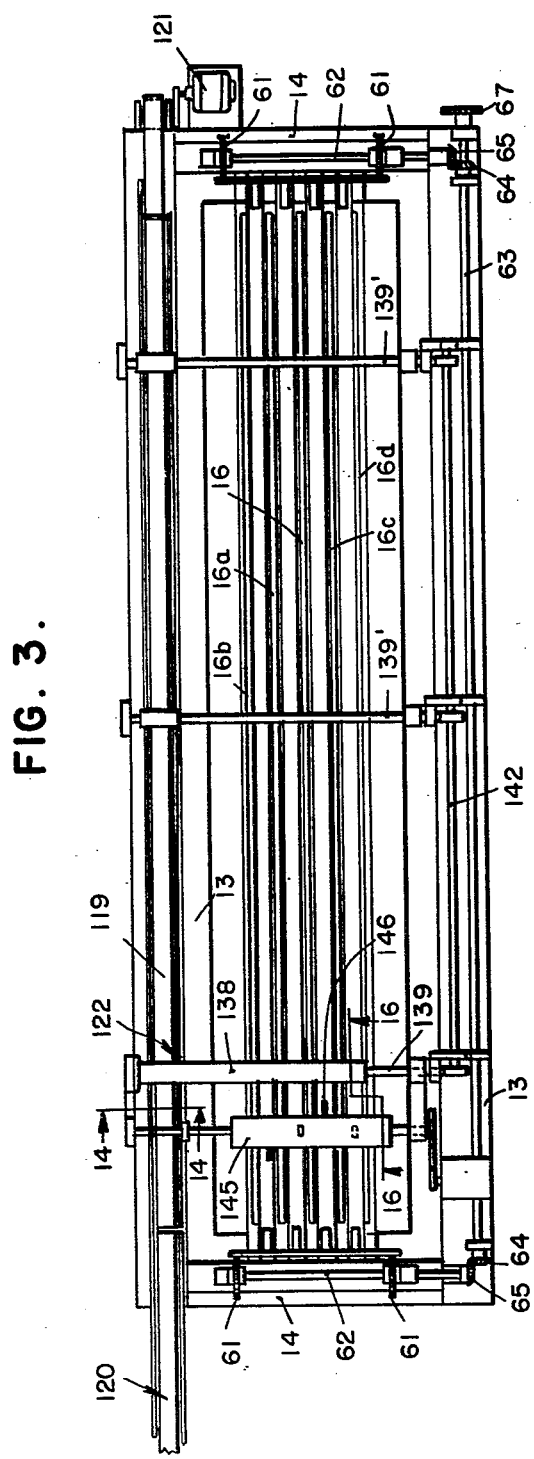
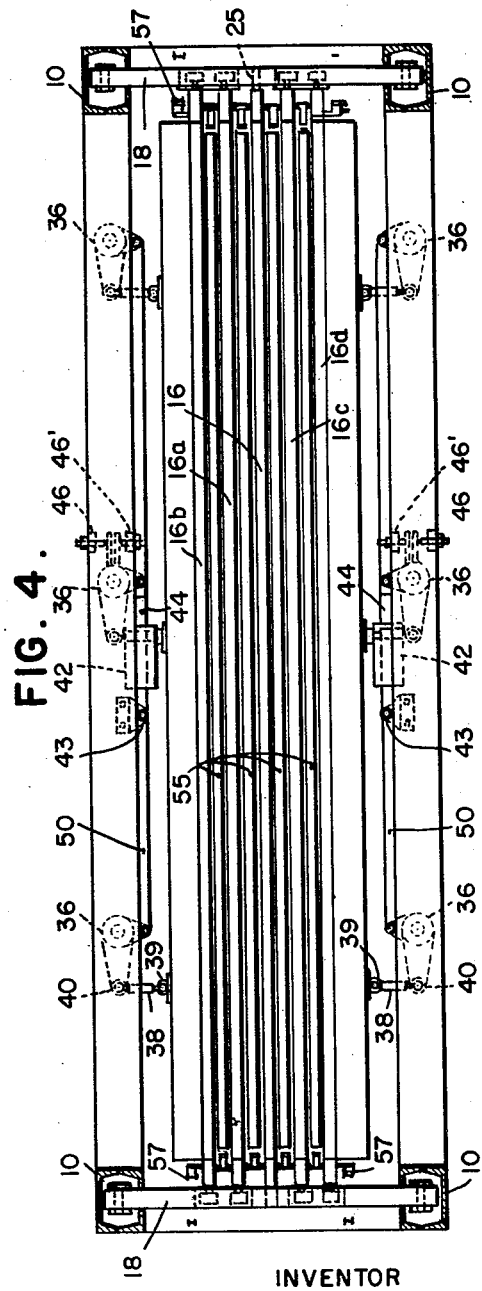

June 18, 1957     I. H. POLK     2,795,939
APPARATUS FOR FREEZING PACKAGED PRODUCTS
Filed Aug. 30, 1951     5 Sheets-Sheet 4
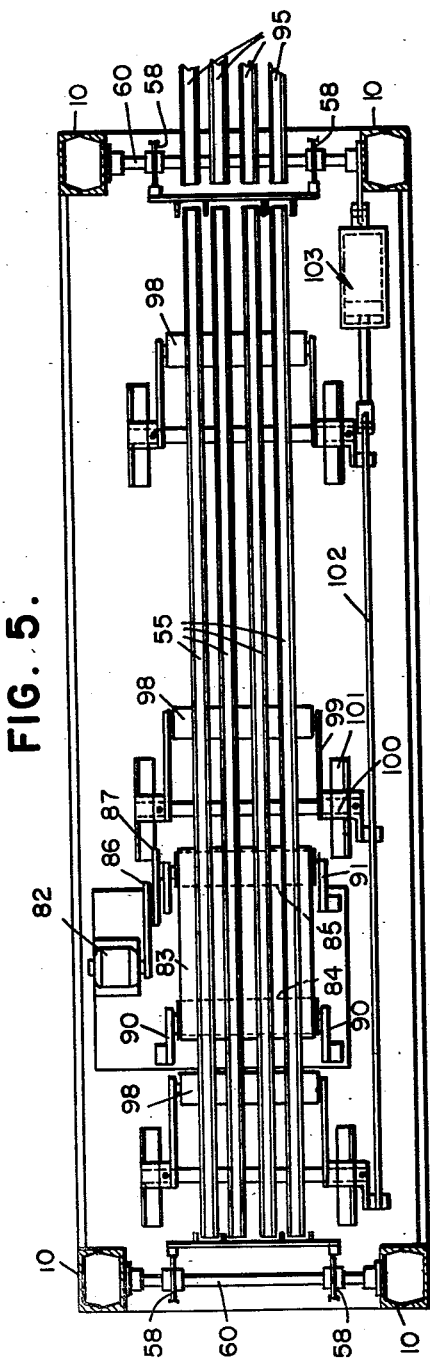
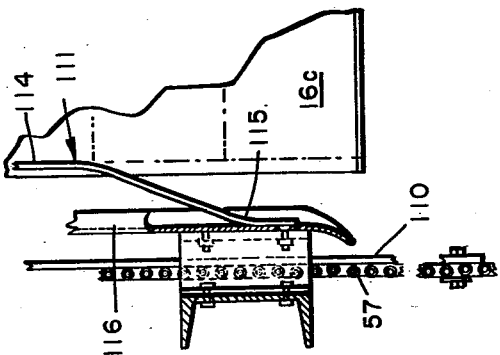
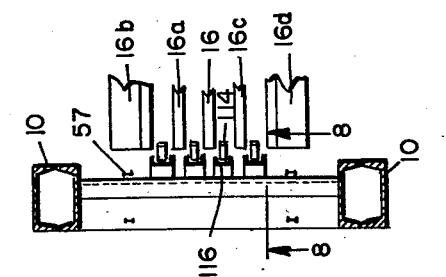
INVENTOR
ISAAC H. POLK
BY
ATTORNEYS June 18, 1957 — I. H. POLK — 2,795,939
APPARATUS FOR FREEZING PACKAGED PRODUCTS
Filed Aug. 30, 1951 — 5 Sheets-Sheet 5

INVENTOR
ISAAC H. POLK
BY
Mason & Graham
ATTORNEYS

2,795,939

APPARATUS FOR FREEZING PACKAGED PRODUCTS

Isaac H. Polk, San Jose, Calif., assignor of 5 percent to William R. Graham and 5 percent to Collins Mason, Los Angeles, and 40 percent to John S. Drum, Jr., and 10 percent to Emory L. Morris, San Francisco, Calif.

Application August 30, 1951, Serial No. 244,360

15 Claims. (Cl. 62—114)

This invention has to do with apparatus for rapidly freezing packaged products. Apparatus of the same general type is set forth in my copending application for patent for Machine for Freezing Packaged Products, Serial No. 66,050, filed December 18, 1948, now Patent No. 2,631,440.

An object of this invention is to provide a new and improved packaged product freezing machine of the type embodying vertically disposed refrigerated plates between which the packages are received, the plates being moved into pressure engagement with the packages to effect freezing. It is a particular object to provide a machine of this type wherein means are provided to accommodate a continuous flow of packages to the machine even though groups of packages are intermittently or periodically fed to and discharged from the freezing plates of the machine.

Another object is to provide improved means for feeding packages to a machine of the general type set forth above whereby the incoming packages remain exposed to the temperature of the surrounding atmosphere for only a minimum amount of time. Another object in this connection is the provision of an improved feed apparatus in which the packages are transferred transversely of the plates of the machine to the spaces therebetween from a single feed belt.

Another object is to provide an improved method and apparatus for removing or discharging packages from the machine, and apparatus in which the packages are moved away from the freezing plates in a direction longitudinally thereof.

Also, an object is to provide an improved simplified means of shearing a row of packages to be discharged from the machine from the packages remaining in the machine.

Still another object is to provide means for feeding packages to and discharging them from a machine of the type indicated without subjecting the packages to any considerable pressure.

It is a particular feature of the invention to provide in a machine of the type indicated a combined elevator and package discharge assembly for use in combination with each pair of plates between which packages are frozen.

A further object is to provide end guide means for the edges of the outermost packages at the two ends of a package freezing machine embodying vertically disposed freezing plates between which the packages are received.

Still another object is to provide means for controlling and coordinating the lateral outward movement of the plates to permit discharge of packages from between the plates. It is also an object to provide means for coordinating the lateral movement of the package elevators with the lateral movement of the plates.

These and other objects will be apparent from the drawings and the following description thereof.

Referring to the drawings:

Fig. 2 is a side elevational view of the apparatus of Fig. 1;

Fig. 3 is a plan view of the apparatus of Figs. 1 and 2;

Fig. 4 is a sectional plan view on line 4—4 of Fig. 2;

Fig. 5 is a sectional plan view on line 5—5 of Fig. 2;

Fig. 6 is a fragmentary section on an enlarged scale on line 6—6 of Fig. 2;

Fig. 7 is a fragmentary section on line 7—7 of Fig. 2;

Fig. 8 is a fragmentary sectional view on line 8—8 of Fig. 7;

Fig. 9 is a perspective view of the package end guide assembly;

Figure 1:
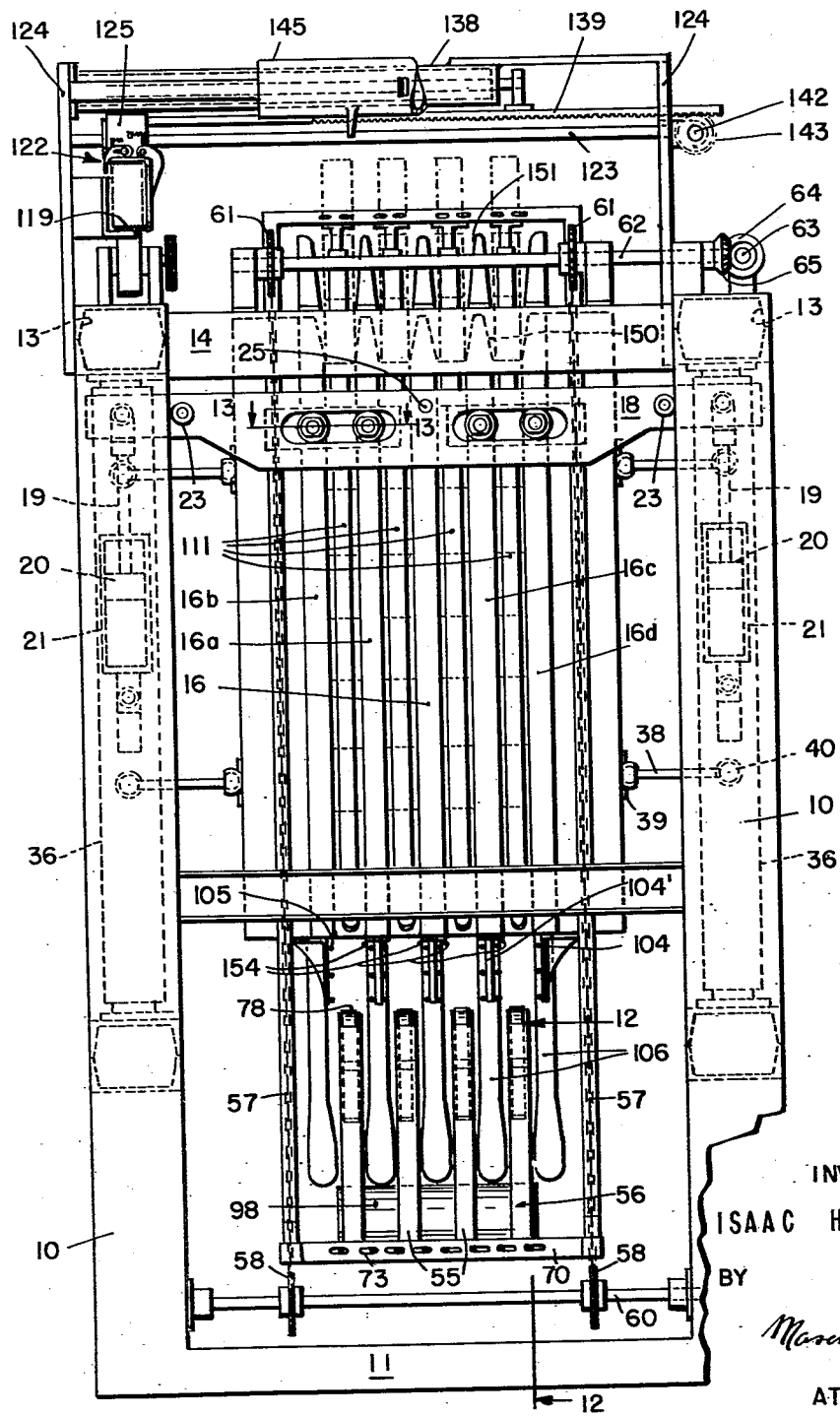
Fig. 1 is an end elevational view, partly broken away, of apparatus embodying the invention.

More particularly describing the invention, the apparatus disclosed herein includes vertically disposed freezing plates which are refrigerated. Packages of food or other product to be frozen are placed between the freezing plates which are brought into pressure engagement with the packages to effect freezing of the contents. The plates are mounted for lateral movement to admit the packages and for vertical movement to effect a shearing action between the packages and the plates when it is desired to free the packages. It is contemplated that in the use of the device, once the machine is loaded and in operation, intermittently a row of packages is discharged from between each pair of plates at the bottom and a row of unfrozen packages admitted between the plates at the top. There may be several rows of packages between the plates and these are advanced each time a row is discharged to make room for a new or unfrozen row of packages.

More particularly describing the apparatus, I provide a frame which includes four vertical columns, indicated by the numeral 10. These are shown connected at their lower ends by a base 11. The upper ends of the columns are connected by longitudinal members 13 and by cross members 14. The frame necessarily embodies other elements, some of which will be referred to later.

The device includes a plurality of vertically hung hollow plates, indicated by numerals 16, 16a, 16b, 16c and 16d. These plates are adapted to be refrigerated by circulating a coolant or refrigerant therethrough in any conventional manner and since this forms no part of the invention and is known to those skilled in the art, the circulation means is not shown.

The plates are suspended from a pair of hangers 18 located one at each end of the machine. The hangers are supported at their ends upon the upper ends of piston rods 19 extending from pistons 20 in cylinders 21. The latter are mounted on the columns 10 in any suitable manner. The cylinders 21 may be provided with suitable inlet-outlet ports at each end and conduits connecting the same to a source of pressure fluid in a conventional manner. Conventional means may be provided between the ends of the hangers and the columns for insuring straight-line vertical movement of the hangers relative to the columns. The hangers are shown provided with guide rollers 23 which ride on the inner edges of the columns.

The innermost or central plate 16 is suspended from the center of the hangers by means of pins 25. The other plates are provided with projecting studs 26 carrying rollers 27 which ride in slots 28 in the hanger thereby permitting a limited amount of lateral movement of the plates 16a, 16b, 16c and 16d.

Figure 13:
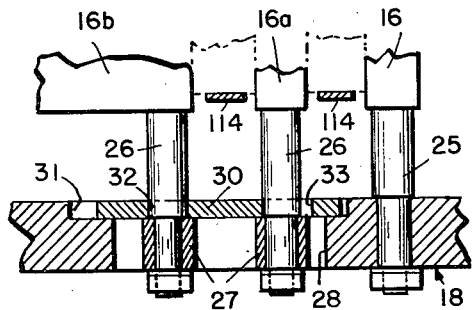
Fig. 13 is an enlarged fragmentary sectional view on line 13—13 of Fig. 1.

In order to coordinate and correlate the outward movement of the plates 16a and 16c when the outer plates 16b and 16d are moved laterally away from the central plate a compensator bar 30 (Fig. 13) is provided for the plates 16a and 16b and another for the plates 16c and 16d. These bars are slidably mounted in recesses 31 on the inner sides of the hangers 18. Each bar is provided with a bore 32 to receive the projection or pin 26 of the outer plate and with a slot 33 to receive the pin 26 of the intermediate plate. With this arrangement, when the outer plates are moved outwardly, this movement is not transmitted to the intermediate plates 16a and 16c until the outer plates have traveled sufficiently to take up the space in the slots 33.

Means are provided for actuating the two outer plates to move them toward and away from the central plate. This means comprises a plurality of vertically extending pivotally mounted bell cranks 36 (Figs. 1, 2, 4 and 6), three being shown for each plate. Each bell crank has a pair of vertically spaced arms 37 which are connected to the outer plates by means of rods 38 having ball ends received in sockets 39 on the outer faces of the outer plates and in sockets 40 on the arms 37 of the bell cranks.

Each set of bell cranks is actuated by a hydraulic means such as a cylinder 42 pivotally mounted on a bracket 43 fastened to the frame. The cylinders each contain a double-acting piston having a projecting piston rod 44 which is connected pivotally to an actuating crank arm 45 on the center bell crank 36. In order to provide for adjustably limiting the relative movement of the bell cranks and hence the relative movement of the plates, depending bars 46, 46' are mounted on the frame and house opposed set screws 47, the latter limiting pivotal movement of the central bell crank through the medium of a split collar 48 mounted on the crank and having extensions 49 between the inner ends of the set screws.

The three bell cranks are connected by a rod 50, which is pivotally secured to outwardly projecting arms 51 on each of the members. It will be apparent that with this construction the hydraulic means, which may be supplied with fluid in any conventional manner, is effective to move the plates laterally in and out.

Figure 10:
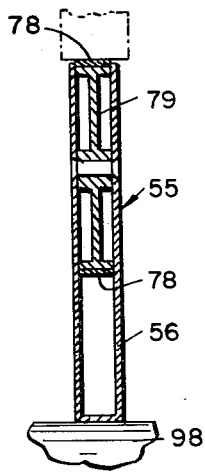
Fig. 10 is a section on line 10—10 of Fig. 2 drawn to an enlarged scale.
Figure 11:
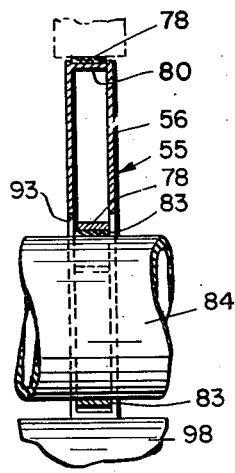
Fig. 11 is a fragmentary section on line 11—11 of Fig. 2 drawn to an enlarged scale.
Figure 12:
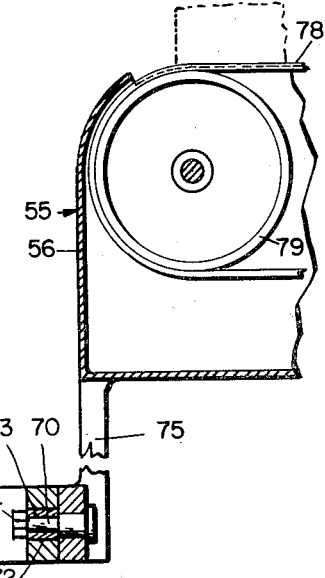
Fig. 12 is a fragmentary sectional view of one end of an elevator conveyor member substantially in the plane of line 12—12 of Fig. 10.

For the purpose of supporting and carrying away packages discharged from between the plates, I provide a plurality of package supporting members 55, one of which is provided for each space between the plates. These members are mounted below the plates for movement upwardly between the plates and are also mounted for limited lateral movement so that they may be maintained oriented with respect to the plates. Each package supporting member comprises an elongated relatively thin structure which has been shown as including a box-like body 56 (Figs. 1, 10, and 12). This body is supported at each end on elevating chains 57, two of which are provided at each end of the machine. The chains pass around sprocket wheels 58 on a lower shaft 60 and around sprockets 61 on an upper shaft 62. The upper shafts are driven by a drive shaft 63 through a medium of meshing gears 64 and 65. Any suitable prime mover may be connected to the outer end 67 of the shaft 63.

The connection between the individual package supporting members and the chains comprises a cross-bar 70 (Figs. 1 and 12) at each end of the machine which is secured to the chains by means of bolts 71 mounted in extensions 70' at the ends of the bar. This bar is slotted at 72 to receive pins or bolts 73, two of which are provided for each end of each package supporting member. Bearing sleeves 74 are provided on pins 73. Each package supporting member is provided with a depending bracket 75 in which the pins 74 are mounted. The package supporting members are made of a width such that they can enter the spaces between the plates and can be moved almost to the top of the plates by means of chains 57.

Each package supporting member includes a longitudinally extending conveyor which is shown as comprising a belt 78 which passes about suitable pulleys 79 at the ends of the member. The upper run of the belt is supported intermediate the pulleys in any suitable manner as by a wall 80 forming part of the body 56 in order to maintain the upper surface thereof substantially level.

The conveyor belts are for the purpose of moving packages which have been discharged from between the plates out of the machine and since this operation takes place with the package supporting members in what is normally their lowest position, which is the one shown in the drawings, means are provided for actuating the belts only when the package supporting members are in lowered position. This means comprises a suitable prime mover 82 (Figs. 2, 4 and 5) which drives a relatively wide belt 83 extending the width of the several package supporting members, the drive belt passing around drums 84 and 85, one of which is driven by the prime mover through suitable belts 86 and 87, and an intermediate pulley 88. The drums are mounted on pivoted arms 90 and 91, respectively, arm 90 being urged upwardly by a spring 92. In this connection, it is pointed out that each of the package supporting members is provided with a recessed portion 93 on its undersurface to receive the drive belt. With this construction, when the prime mover 82 is operating and the package supporting members are in lowered position, the lower runs of the conveyor belts frictionally engage the drive belt and are driven in a direction to cause the upper runs of the conveyors to move from left to right in Fig. 2 and deliver packages to take-away conveyors 95.

In the normal operation of the apparatus a single row of packages is discharged from between each pair of plates at any one time. Means are therefore provided for raising the package supporting members only a limited distance so as to bring the upper surfaces of these members into contact with the lowermost row of packages between the plates. This means includes a plurality of rollers 98 beneath the package supporting members and extending laterally thereof for contact with the under surfaces of the members. The rollers are supported on bell-cranks 99 pivotally mounted at 100 on base frame members 101. The bell-cranks are actuated by a common connecting rod 102. The connecting rod may be operated in any conventional manner as, for example, by means of a piston and cylinder structure 103 which can be supplied with fluid in any conventional manner.

The lower edges of the plates are provided with depending package guides to insure the packages being retained on the package support members and to insure the later being maintained in a position below the spaces between plates. The guides comprise depending brackets 104 and 104' spaced along the lower edge of the plates and wires 105 fixedly secured thereto and extending longitudinally of the plates.

For the purpose of orienting the package support members laterally with respect to the plates, I provide depending, stiff members 106, which may be continuations of the members 104, on the plates at each end. These members extend between the package support members and serve to transmit lateral movement of the plates to the package support members.

At the ends of the plates I provide means for abutting the outer end surfaces of the outermost packages between the plates and this means comprises a package end guide assembly for each end of the machine. Referring to Figs. 7–9, particularly, each end guide assembly comprises a frame 110 of general inverted U-shape from which are suspended end guide straps 111, one for each space between plates. The frame extends through guides 112 forming part of the main frame of the machine and the lower ends of the legs of the frame are attached to the aforementioned chains 57. The two inner guide straps are fixedly mounted on frame 110 while the outer two are mounted for limited lateral movement thereon as by the pin and slot connections 113. Each end guide member has a central portion 114 which projects inwardly of the machine so as to extend between the plates. The lower ends 115 project outwardly of the machine and are received in vertically extending guide channels 116 mounted on the frame of the machine. The outer guide channels are wider than the guide straps to permit lateral movement of the outer guide straps with the plates. It will be apparent that with the structure described the end guide members prevent migration of the packages endwise of the machine and that these members move vertically with the package support members relative to the plates.

I also provide a feed mechanism for delivering packages to the spaces between the plates. This mechanism comprises a conveyor belt 119 extending along one side of the apparatus in a region above the plates which is fed packages from a package supply belt 120. A motor 121 drives belt 119. I also provide a transversely operable package transfer carriage 122 for the purpose of moving an aligned group of packages laterally from the belt to the spaces between the plates.

The transfer carriage is mounted for movement on transversely extending rods 123 secured between uprights 124 of the frame. The carriage includes three mounting blocks 125 which slideably receive the rods. Dependently mounted on the blocks is a pivoted wall 126 which extends longitudinally of the apparatus and corresponds in length to the length of the plates. This member is mounted on the block 125 by pivotally mounted brackets 127 secured to pins 128. The wall 126 terminates in a ledge-like flange 126'. A stationary wall 130 is mounted on the frame of the apparatus and extends longitudinally thereof. This cooperates with wall 126 when the latter is in the position shown in Fig. 14, and with conveyer belt 119 to form a package-receiving space 131. A package holding bar 132 is provided being mounted on the blocks 125, for limited movement by a slot 133, pin 134 and bolt 135. A package stop wall 137 is provided at the end of space 131.

Figure 14:
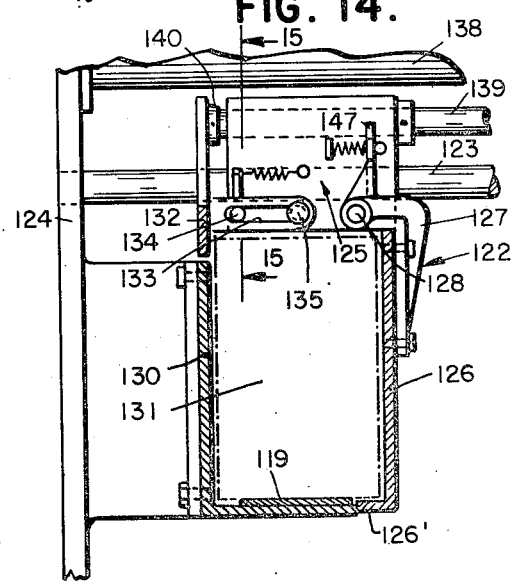
Fig. 14 is a fragmentary sectional view enlarged on line 14—14 of Fig. 1.
Figure 15:
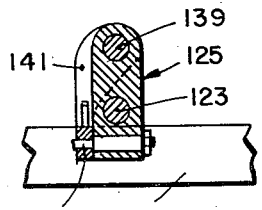
Fig. 15 is a section on line 15—15 of Fig. 14.
Figure 16:
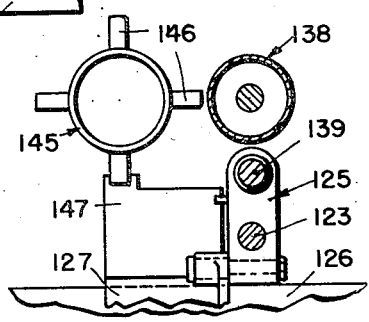
Fig. 16 is a section on line 16—16 of Fig. 3.

The transfer carriage is operated transversely by a cylinder and piston mechanism 138 which is mounted at one end on the frame and at the other end on a transversely extending rack bar 139. The particular mounting block shown in Fig. 14 is mounted on this rack bar to move herewith. However, in the embodiment shown, the mounting blocks slideably receive the rack bars, being held to a very limited movement relative thereto by a collar 140 fixed to the bar and by arm 141 forming part of the package holding bar 137 and also fixed to the rack bar. As the piston and cylinder mechanism is expanded or lengthened, the transfer carriage is correspondingly moved transversely of the apparatus as a whole. The other mounting blocks are fixed to rack bars 139' and all the rack bars are connected for synchronous movement through the medium of a shaft 142 having pinions 143 fixed thereon which engage the teeth of the respective rack bars.

The piston and cylinder mechanism may be operated by any conventional fluid and conventional control means.

Since the transfer carriage must deliver successive rows of packages as they accumulate in the space 131 to the respective spaces between plates, a trip mechanism is provided for the transfer carriage. This is shown as comprising a drum 145 having radially projecting, laterally and longitudinally spaced fingers 146, one for each of the spaces between plates. As the transfer carriage moves across the machine the appropriate finger engages a trip lever 147, formed as a part of the bracket 127 supporting wall 126 (Fig. 14), to move the wall 126 outwardly from the row of packages held between this wall and the bar 132 permitting the row of packages to drop into the appropriate space between plates.

The upper ends of the plates are somewhat tapered as indicated at 150 to readily receive the packages. Tapered stationary guide walls 151 are provided above the plates to receive the packages and guide them between the plates. Suitable means (not shown) can be provided for rotating the drum 146 sufficiently to bring the next finger into position to be engaged by the trip lever portion of the wall 126 each time the transfer carriage makes a round trip from the position over the belt 120 to a position over one of the spaces between the plates. Also any conventional means may be provided for automatically stopping the transfer carriage over the appropriate space between plates and returning the carriage to its original position. Further, a gate 153 is provided at the entrance to the transfer carriage for stopping incoming packages while the transfer carriage is in operation. Conventional means can be provided to control the gate.

In the operation of the machine, the packages progress through the spaces between the plates, unfrozen packages being received at the top and frozen packages being discharged at the bottom. The progression of the packages through the machine is intermittent and for each period of time that the packages remain stationary, they are subjected to pressure exerted by the walls of the plates.

Assuming the spaces between the plates to be completely filled with packages from top to bottom a typical cycle of operation of the machine would be as follows: The packages between the plates are subjected to pressure from the plates for a given period of time. During this time packages delivered to the machine by conveyor 120 accumulate in the space 131 and are transferred a row at a time to the spaces between the plates by the transfer carriage. The package supporting members are then raised to contact the lowermost rows of packages. This is accomplished by operation of the bell crank mechanism beneath the package supporting members. The lateral pressure of the plates against the packages is then relieved and the plates caused to move downwardly a slight amount by operation of cylinder-piston mechanisms 21 to shear the packages free of the plates, the packages being held against downward movement by the package supporting member. The plates are then moved upwardly to their original position.

The package support members are then moved downwardly until one complete row of packages is exposed below the freezing surfaces of the plates. During this downward movement of the packages the unfrozen packages enter between the plates at the top. The plates are then brought together into pressure engagement with the packages remaining between them. During this latter movement the rows of packages projecting below the plates are sheared or broken away from the packages remaining between the plates by lateral movement through the action of laterally projecting beads 154 at the lower ends of the plates. The centerplate is provided with two such beads and the adjacent plates with one such bead so that there is one bead for each space between plates. The package support members are then moved slightly lower and this causes the conveyor belts to engage the drive belt with the result that the packages are removed out of the machine onto take-away conveyor belts 95.

During the freezing cycle, packages are delivered to the upper ends of the plates below the freezing surfaces of the plates in the manner previously described.

Although I have illustrated and described a preferred form of my invention, I contemplate that various changes and modifications can be made without departing from the invention, the scope of which is indicated by the following claims.

I claim:

1. In a machine for freezing packaged substances, a pair of substantially vertically disposed refrigerated plates between which packages of a substance to be frozen are received, an elongated package supporting means of a width to be received between said plates mounted for movement vertically between said plates, said means including a longitudinally movable package supporting member across the top of said means, and means for imparting movement to said member.

2. In a machine for freezing packaged substances, a pair of substantially vertically disposed refrigerated plates between which packages of a substance to be frozen are received, an elongated package supporting means of a width to be received between said plates mounted for movement vertically between said plates, said means including a longitudinally movable package supporting member across the top of said means, and means for imparting movement to said member, only when said means is in a lowered position below said plates.

3. In a machine for freezing packaged substances, a pair of substantially vertically disposed refrigerated plates between which packages of a substance to be frozen are received, an elongated package supporting means of a width to be received between said plates mounted for movement vertically between said plates, said means including a conveyor belt having an upper run across the top of said means upon which the packages are supported, and power means for moving said belt.

4. In a machine for freezing packaged substances, a pair of substantially vertically disposed refrigerated plates between which packages of a substance to be frozen are received, an elongated package supporting means of a width to be received between said plates mounted for movement vertically between said plates, said means including a conveyor belt having an upper run across the top of said means upon which the packages are supported, a power drive means, and means operable when the package supporting means is in a predetermined position for establishing a driving connection between said power drive means and said conveyor belt.

5. In a machine for freezing packaged substances, a pair of substantially vertically disposed refrigerated plates between which packages of a substance to be frozen are received, an elongated package supporting means of a width to be received between said plates mounted for movement vertically between said plates, said means including a conveyor belt having an upper run across the top of said means upon which the packages are supported, a prime mover, and a drive belt driven by said prime mover and positioned to be engaged by said first mentioned belt when said package supporting means is in a predetermined position.

6. In a machine for freezing packaged substances, a pair of substantially vertically disposed refrigerated plates between which packages of a substance to be frozen are received, an elongated package supporting means of a width to be received between said plates mounted for movement vertically between said plates, and a package end guide member of a width to be received between the plates mounted at each end of the space between the plates.

7. A machine as defined in claim 6 in which said end guide members are mounted for movement vertically with said package supporting means.

8. In combination with laterally spaced vertically disposed refrigerated plates between which packages containing a substance to be frozen are placed for freezing, a plurality of package end guide members of a width to be received between the plates, said end guide members being mounted one at each end of the spaces between plates, and means for producing relative vertical movement between said plates and said end guide members.

9. In a machine for freezing packaged substances, substantially vertically disposed laterally spaced refrigerated plates presenting opposed flat surfaces between which packages of a substance to be frozen are received, means for moving said plates laterally to widen the spaces therebetween and for moving the plates into engagement with packages, laterally extending projections along one edge of said plates beyond said flat surfaces, there being one such projection for each package-receiving space between plates, said projections serving to shear packages disposed beyond said flat surfaces of the plates from adjacent packages located between said flat surfaces upon movement of said plates toward each other.

10. In a machine for freezing packaged substances, a plurality of substantially vertically disposed laterally spaced refrigerated plates between which packages of a substance to be frozen are received, means supporting said plates for lateral movement to vary the spacing between plates, means for moving said plates toward and away from each other, means coordinating the movement of said plates to limit the movement of each plate to a predetermined amount, a plurality of elongated horizontally disposed package supports one for each space between plates, said supports being mounted for limited lateral movement, and means for moving said supports laterally in response to lateral movement of said plates.

11. In a machine for freezing packaged substances, a plurality of substantially vertically disposed laterally spaced refrigerated plates between which packages of a substance to be frozen are received, means supporting said plates for lateral movement to vary the spacing between plates, means for moving said plates toward and away from each other, a plurality of elongated horizontally disposed package supports one for each space between plates, said supports being mounted for lateral movement, and means for moving said supports laterally in response to lateral movement of said plates.

12. In a machine for freezing packaged substances, a plurality of substantially vertically disposed laterally spaced refrigerated plates between which packages of a substance to be frozen are received, means supporting said plates for lateral movement, means for moving said plates toward and away from each other, a plurality of elongated horizontally disposed longitudinally movable package supporting conveyors, one for each space between plates, said conveyors being mounted for limited lateral movement, and means coordinating lateral movement of the conveyors with lateral movement of the plates to maintain the orientation of said conveyors relative to said plates.

13. In a machine for freezing packaged substances, a plurality of substantially vertically disposed laterally spaced refrigerated plates between which packages of a substance to be frozen are received, package guide means extending below each plate within the plane of the sides of the plate, and a package supporting conveyor for each space between plates in the region of said guide means, said conveyors being located respectively between vertical prolongations of said guide means.

14. A device as defined in claim 13 in which certain of said plates and said conveyors are independently mounted for lateral movement and in which members depend from said plates to positions between said conveyors for transmitting lateral movement of said plates to said conveyors.

15. In combination with a machine embodying laterally spaced, vertically disposed, refrigerated plates between which rows of packages are placed for freezing and between which the rows of packages are intermittently progressively moved from the top to the bottom, means for delivering rows of packages to said plates a row at a time, comprising conveyor means for delivering packages to said machine, means for accumulating delivered packages in a row parallel to said plates, and transfer carriage means for delivering a row of accumulated packages transversely of the machine to a predetermined area above and between a pair of said plates.

(References on following page)

References Cited in the file of this patent

UNITED STATES PATENTS

| Number | Name | Date |
|---|---|---|
| 1,822,089 | Hall | Sept. 8, 1931 |
| 1,905,131 | Birdseye | Apr. 25, 1933 |
| 1,998,431 | Birdseye | Apr. 23, 1935 |
| 2,027,372 | Davison | Jan. 14, 1936 |
| 2,228,999 | Birdseye | Jan. 14, 1941 |
| 2,232,383 | Grieg | Feb. 18, 1941 |
| 2,242,527 | Knowles | May 20, 1941 |
| 2,260,450 | Guinane | Oct. 28, 1941 |
| 2,283,923 | Hall | May 26, 1942 |
| 2,302,169 | Baker | Nov. 17, 1942 |
| 2,315,768 | Burnette | Apr. 6, 1943 |
| 2,485,509 | Raye | Oct. 18, 1949 |
| 2,538,734 | Patterson | Jan. 16, 1951 |
| 2,563,938 | Kirk | Aug. 14, 1951 |
| 2,608,069 | Amerid | Aug. 26, 1952 |
| 2,631,440 | Polk | Mar. 17, 1953 |

FOREIGN PATENTS

| Number | Country | Date |
|---|---|---|
| 584,335 | Great Britain | Jan. 13, 1947 |